United States Patent [19]

Mori et al.

[11] Patent Number: 5,351,942
[45] Date of Patent: Oct. 4, 1994

[54] CLAMP APPARATUS USED IN HOLE MACHINING DEVICE

[75] Inventors: Tadashi Mori; Tetsuo Kayukawa, both of Seki, Japan

[73] Assignee: Miyakawa Industry Co., Ltd., Seki, Japan

[21] Appl. No.: 973,987

[22] Filed: Nov. 5, 1992

[30] Foreign Application Priority Data

Nov. 6, 1991 [JP] Japan ................... 3-290233

[51] Int. Cl.$^5$ ................................................. B23Q 3/08
[52] U.S. Cl. ........................................ 269/25; 269/152; 269/329
[58] Field of Search ......................... 269/25, 152–155, 269/329; 408/115 R, 103, 72 R

[56] References Cited

U.S. PATENT DOCUMENTS

| | | | |
|---|---|---|---|
| 2,826,809 | 3/1958 | Lapastora | 269/152 |
| 4,664,364 | 5/1987 | Lymburner | 269/329 |
| 4,738,438 | 4/1988 | Horie et al. | 269/329 |
| 4,863,150 | 9/1989 | Hodl et al. | 269/329 |

Primary Examiner—Robert C. Watson
Attorney, Agent, or Firm—Limbach & Limbach

[57] ABSTRACT

A clamp apparatus used for machining a workpiece, such as a structural beam, includes a stationary clamp apparatus and a movable clamp apparatus. The stationary clamp apparatus clamps onto a first side or flange of the workpiece, and the movable clamp apparatus clamps onto another, generally opposite side of the workpiece. The movable clamp apparatus is capable of shifting position in the direction of the stationary clamp means. A pair of fastening mechanisms are positionably secured to the clamp apparatuses, for securing and positioning the workpiece with respect to the clamp apparatuses.

3 Claims, 5 Drawing Sheets

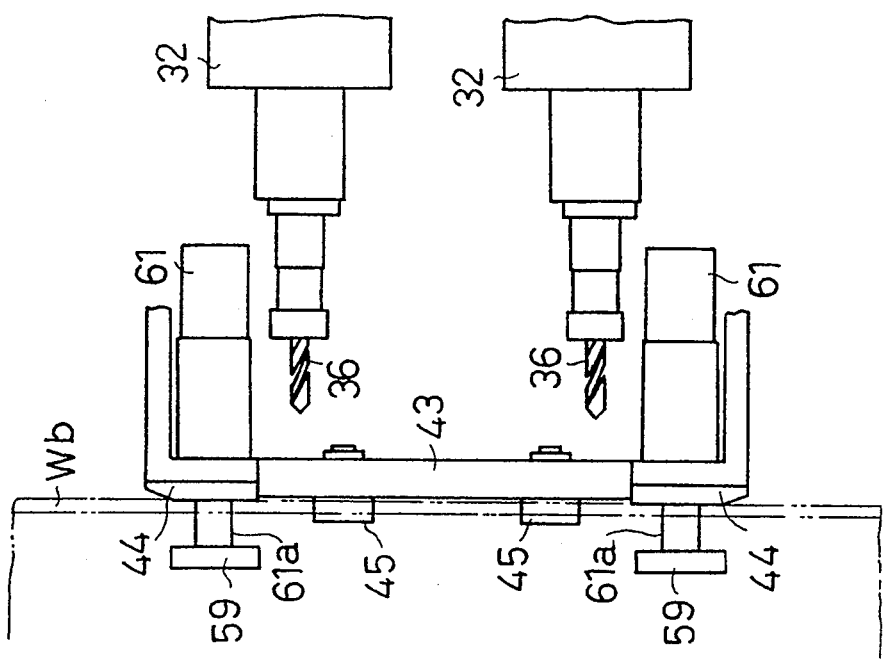
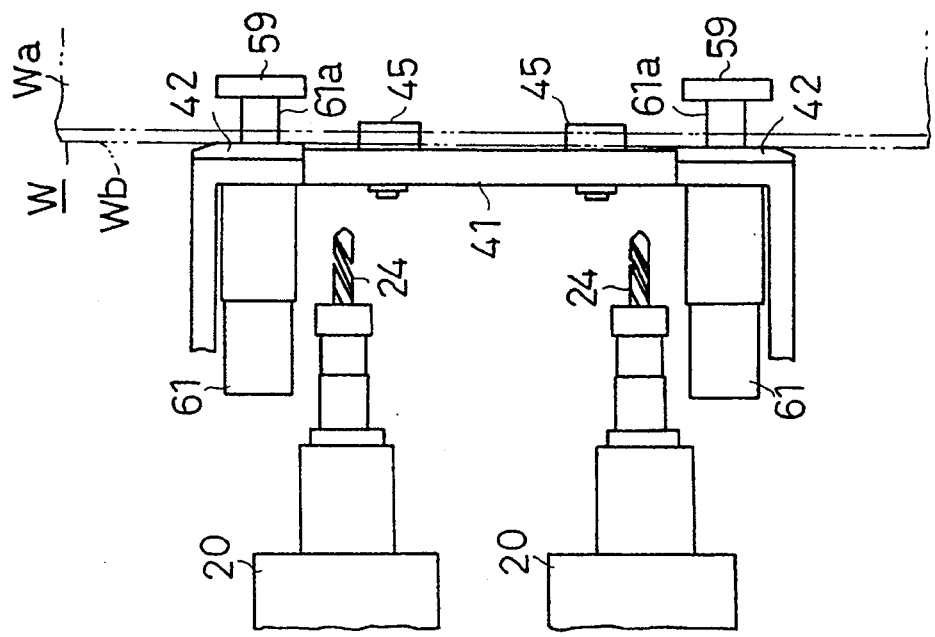

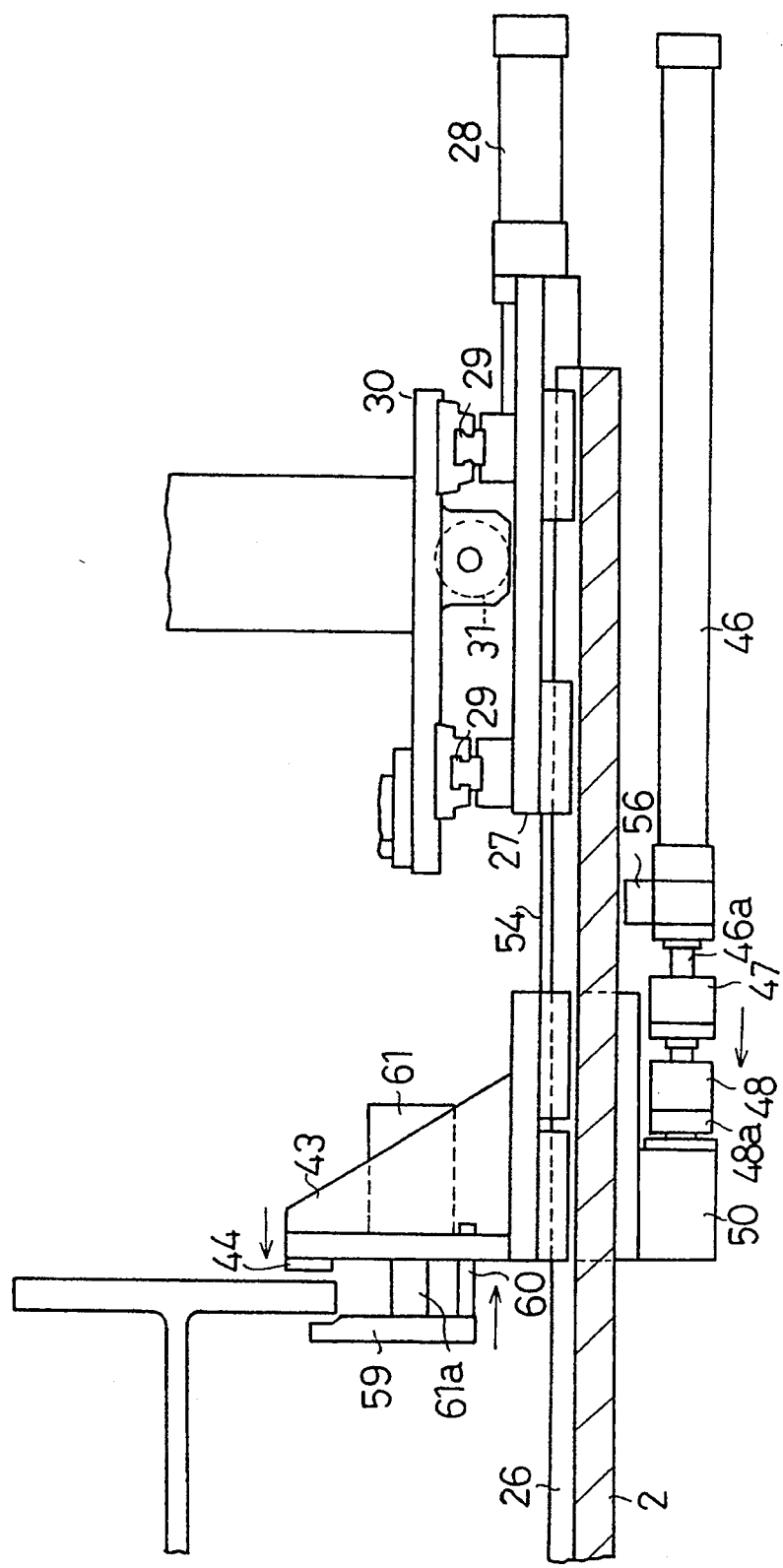

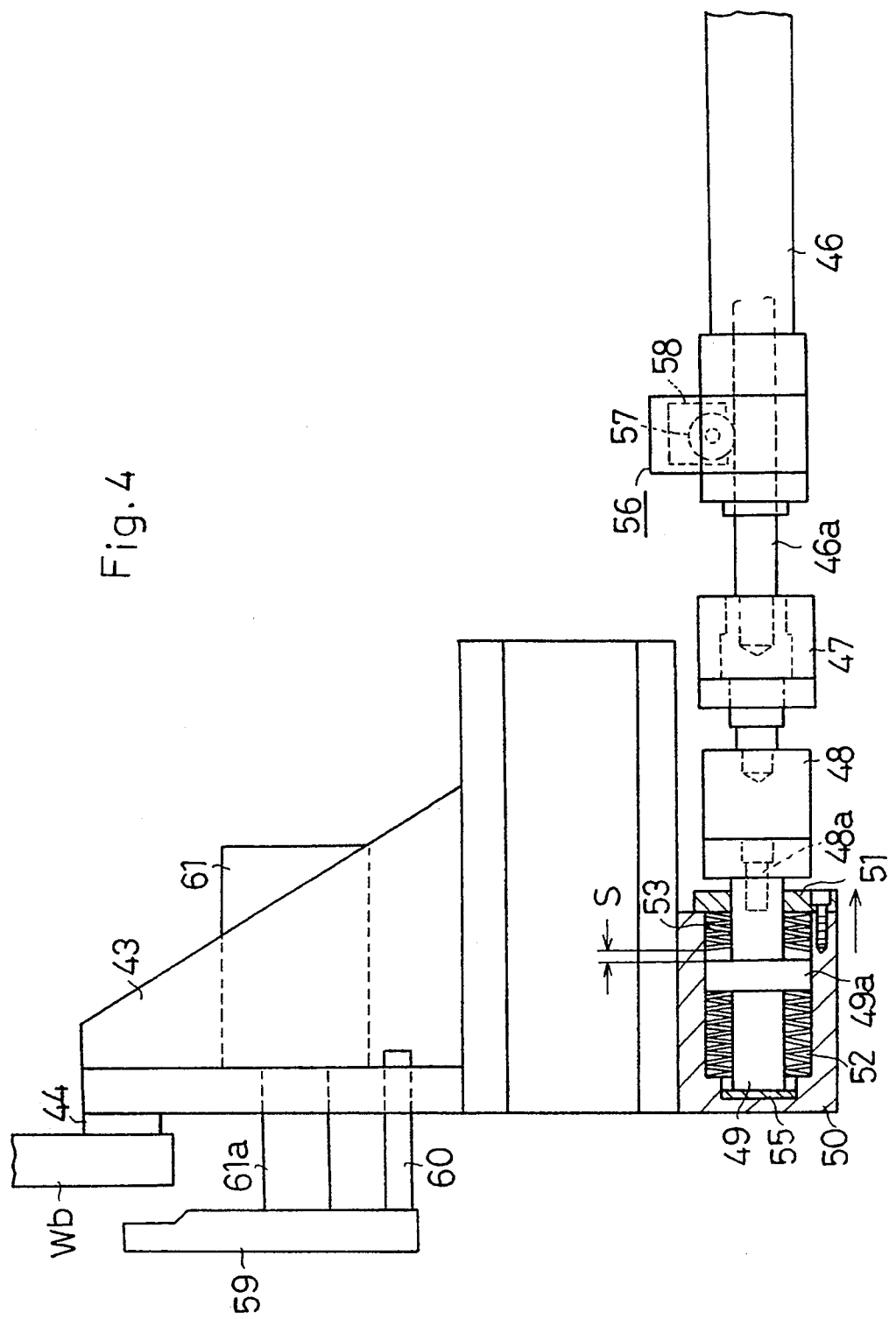

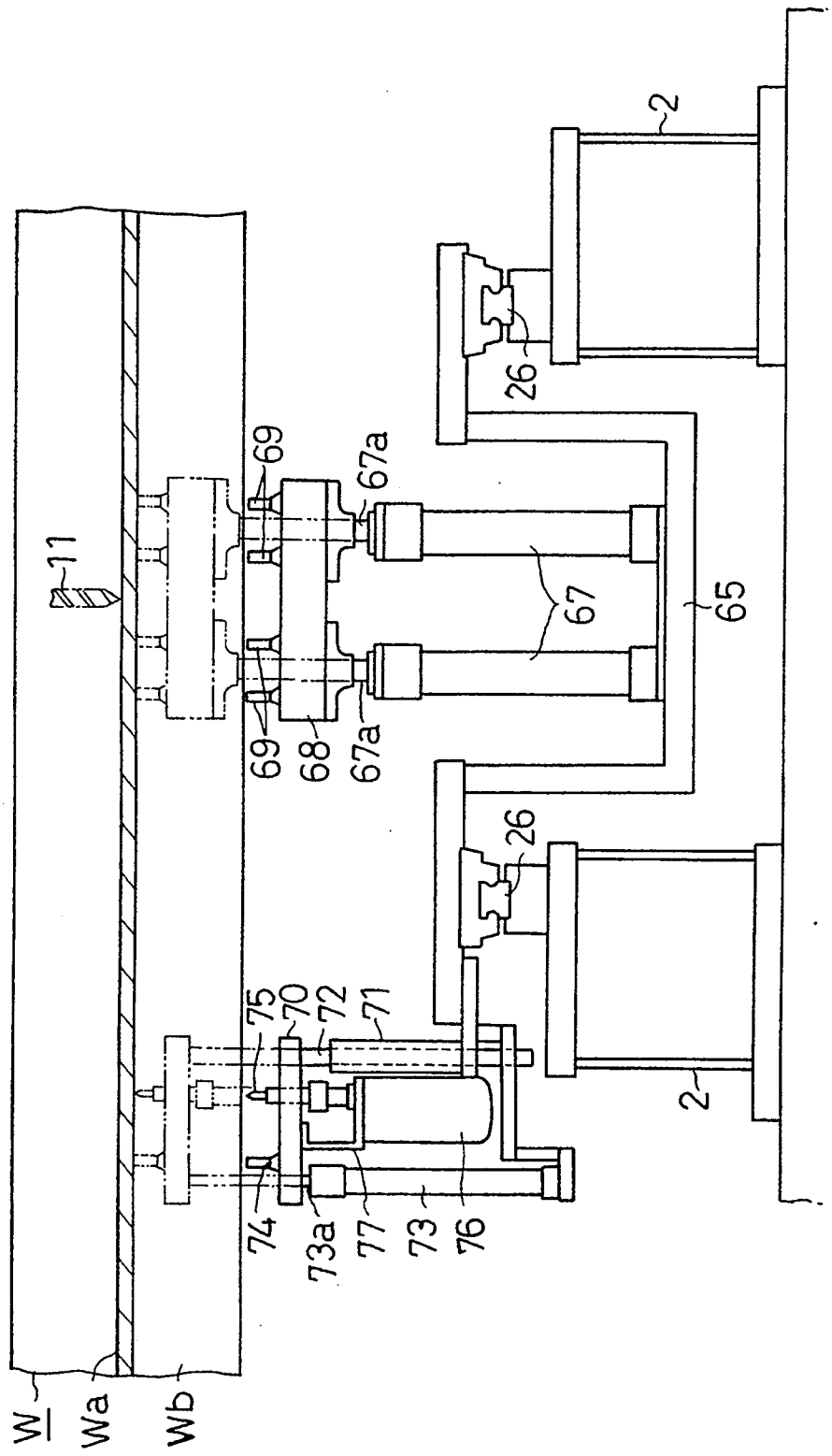

CLAMP APPARATUS USED IN HOLE MACHINING DEVICE

BACKGROUND OF THE INVENTION

1. Field of the Invention

The present invention relates to a hole machining device for drilling a workpiece, having some structural forms such as H-beam and U-beam. More particularly, the hole machining device includes a clamp apparatus for clamping the workpiece at a predetermined drilling position.

2. Description of the Related Art

A clamp apparatus in conventional hole machining devices includes a stationary clamp, which is disposed at the drilling position and which contacts the outer peripheral surface of a first flange of a workpiece facing the stationary clamp. A movable clamp is provided, and contacts the outer peripheral surface of a second flange of the workpiece, facing the movable clamp apparatus. The movable clamp is driven toward the stationary clamp. Therefore, both the first and second flanges of the workpiece are clamped by means of the two clamps.

However, in the conventional clamp apparatus, the first and second flanges are clamped with a significant lateral large force, in order to securely clamp the workpiece between the stationary clamp and the movable clamp. Thus, if the workpiece such as a structural beam, does not have an even surface, the workpiece cannot be securely clamped. Further, during clamping, the workpiece is caused to bend, and its surface is further twisted. Consequently, the drilling of the workpiece cannot be achieved accurately at the precise location.

Nowadays, large structural beams such as H-beams are used in the high-rise buildings. H-beam is constructed in such a way that a web is welded between a pair of relatively large flanges. When such an H-beam is clamped at both outer peripheral surfaces of the first and second flanges by the conventional clamp apparatus the web tends to warp. Therefore, it would be difficult to securely clamp the warped large H-beam, and the drilling operation cannot be achieved accurately.

SUMMARY OF THE INVENTION

Accordingly, the present invention is to provide an invented apparatus to overcome the foregoing drawback. It is a primary object of the present invention to provide a clamp apparatus used in a hole machining device. The clamp apparatus securely clamps a workpiece, such as a structural beam which is warped and distorted to a certain extent. The clamp apparatus prevents the workpiece from bending during clamping, and off-sets the predetermined drill position during drilling.

To achieve the foregoing and other objects and in accordance with the purpose of the present invention, the hole machining device includes a stationary clamp apparatus, which contacts with the outer peripheral surface of a first flange of the workpiece facing the stationary clamp apparatus. A movable clamp apparatus is also provided, and faces the stationary clamp apparatus. Each clamp apparatus has a fastener disposed at both inside surfaces of the stationary apparatus and movable clamp apparatus. Each fastener clamps a corresponding lower edge of the first and second flanges of the workpiece together, to the corresponding clamp apparatus.

The pair of fasteners are caused to withdraw from the associate stationary apparatus and the movable clamp apparatus. Then, the workpiece is placed at the desirable drill position. As the movable clamp apparatus is shifted toward the stationary clamp apparatus, the outer peripheral surface of the first flange of the workpiece facing the stationary clamp apparatus comes into contact with the stationary clamp apparatus. Similarly, the outer peripheral surface facing the movable clamp apparatus comes into contact with the movable clamp apparatus. As a result, the workpiece is securely positioned at the predetermined drill position. As each of the fasteners is shifted toward the corresponding clamp apparatus, each lower edge of the corresponding first and second flanges of the workpiece is clamped between the associate fastener and the corresponding clamp apparatus. Therefore, the workpiece is clamped at the predetermined drill position.

BRIEF DESCRIPTION OF THE DRAWINGS

The features of the present invention that are believed to be novel are set forth with particularity in the appended claims. The invention, together with the objects and advantages thereof, may best be understood by reference to the following description of the preferred embodiments together with the accompanying drawings in which:

FIGS. 2A and 2B combine to provide a partially exploded plan view illustrating an essential part of the clamp apparatus;

FIG. 3 is a partially exploded front cross-sectional view of the clamp apparatus shown in FIGS. 2A and 2B;

FIG. 4 is a further partially exploded front cross-sectional view of the clamp apparatus in FIG. 3; and FIG. 5 is a side cross-sectional view illustrating a support apparatus for supporting a web of the H-beam, and a marking device.

DETAILED DESCRIPTION OF THE PREFERRED EMBODIMENTS

Figure 1:
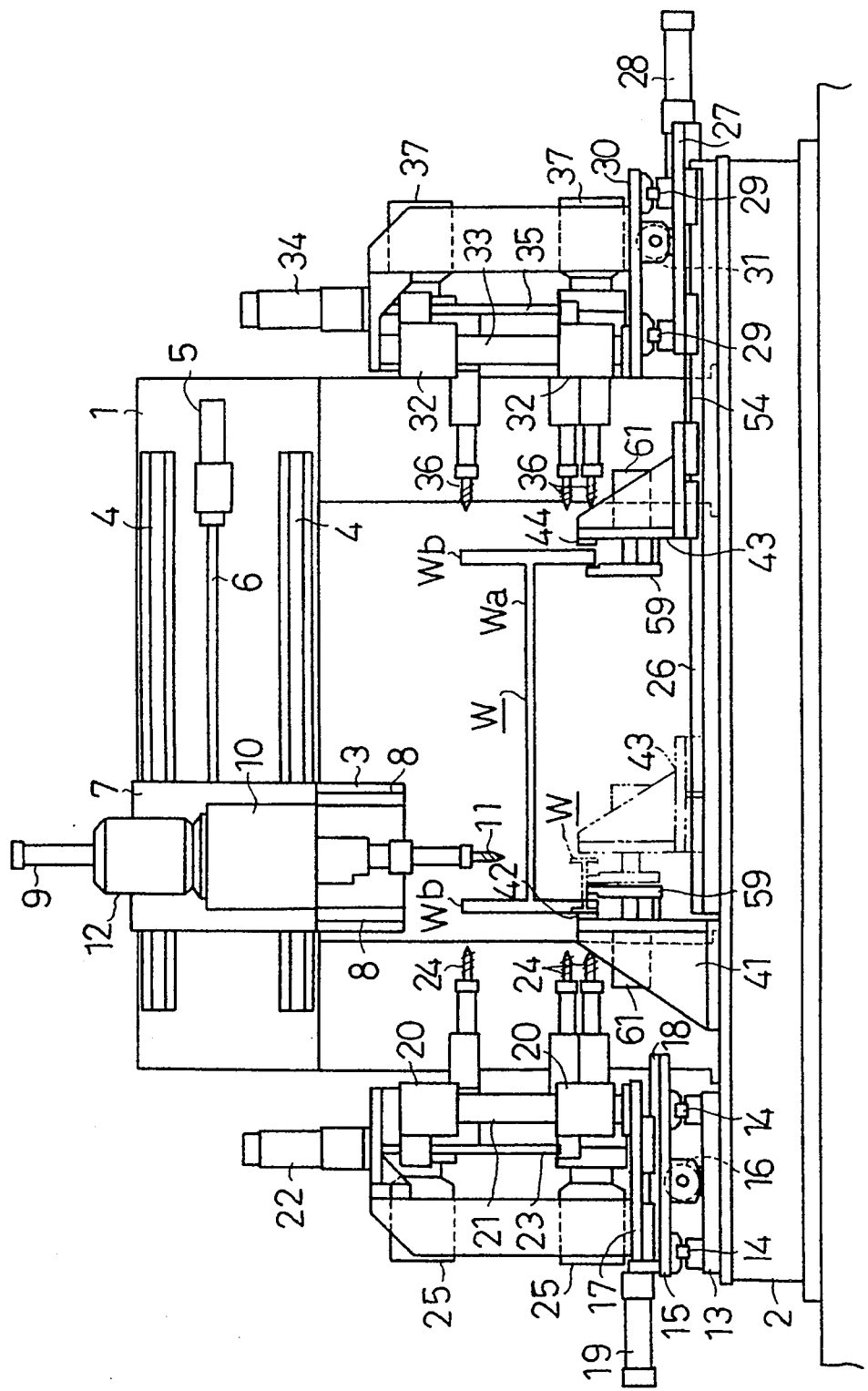
FIG. 1 is a front view of a clamp apparatus used in the hole machining device for drilling a structural member such as an H-beam.

Referring now more specifically to preferred drawings, there is described a clamp apparatus used in a hole machining device for drilling a structural member such as H-beam, in accordance to the present invention.

As illustrated in FIG. 1, a frame 1 is generally U-shaped, and is secured to a base 2 in the upright position. A workpiece W such as a structural H-beam is conveyed between two upstanding pillers of the frame 1. A carriage 3 is movably supported at the front section of the frame 1, along two generally parallel rails 4. The carriage 3 is horizontally shifted by a screw rod 6 which is driven by a motor 5. A support 7 is movably supported at the front section of the carriage 3, along two generally parallel rails 8. The support 7 is vertically shifted by a cylinder 9, along the rails 8. A drill head 10 is securely mounted at the front section of the support 7. A drill 11, which is secrued to the drill head 10, is rotated by a motor 12 to drill a supported web Wa of the workpiece W.

A fixed support plate 13 is secured to the left side of the upper surface of the base 2. The upper surface supports two rails 14 which are disposed in the front and rear of the upper surface. A carriage 15 is movably mounted on the rails 14. The carriage 15 is moved by a motor 16 in the front and rear directions, along the rails 14.

A support 17 is movably mounted on the carriage 15, via a pair of rails 18. The support 17 is shifted by the action of a cylinder 19, along the rails 18, in the right and left directions. A plurality of drill heads 20 are movably supported on the support 17, via a guide 21. Each one of the drill heads 20 is individually shifted by a screw rod 23 in the vertical direction, which is driven by a motor 22. A drill 24, which is securely mounted at the distal end of the respective axile of each drill head 20, is rotated by a motor 25, to drill the supported first flange Wb of the workpiece W.

Two support rails 26 are disposed on the upper surface of the base 2 in the right and left directions. The support rails 26 are generally similar to the rails on the fixed support plate 13.

A movable support plate 27 is movably supported on the rails 26. The support plate 27 is horizontally (in the right and left direction) moved by a cylinder 28, along the rails 26. A support 30 is movably supported on the support plate 27, via the rails 29. The support 30 is shifted by a motor 31 in the front and rear directions, along the rails 29. A plurality of drill heads 32 are movably supported on the support 30, via a guide 33. Each one of the drill heads 32 is individually shifted by a screw rod 35 in the vertical direction, and is driven by a motor 34. A drill 36, which is securely mounted at the distal end of the respective axial of each drill heads 32, is rotated by a motor 37, to drill the supported second flange Wb of the workpiece W.

As illustrated in FIGS. 1, 2A and 2B a stationary clamp apparatus 41 is secured in the upright position on the upper surface of the base 2, and is facing the left end section of the rails 26. Two contacts 42 are provided on the inner peripheral surface of the stationary clamp apparatus 41, and engageable with respect to the outer peripheral surface of the first flange Wb of the workpiece W.

A movable clamp apparatus 43 is movably supported on the rails 26 at a predetermined position with respect to the stationary clamp apparatus 41. Two contacts 44 are provided on the inner peripheral surface of the movable clamp apparatus 43, and engageable with respect to the outer peripheral surface of the second flange Wb of the workpiece W. As illustrated in FIG. 2, two pairs of paired guide rollers 45 are rotatably secured to the inner peripheral surfaces of the clamp apparatuses 41 and 43. When the workpiece W is moved in the longitudinal direction, the first and second flanges Wb of the workpiece W are guided to the desirable position through the engagement with the guide rollers 45.

As illustrated in FIGS. 3 and 4, a main cylinder 46 is disposed underneath the base 2. A sub-cylinder 48 is attached to a piston rod 46a of the cylinder 46, via a coupling 47. An actuating pin 49 is attached to a plunger 48a of the cylinder 48. An enlarged portion 49a is formed at the central section of the actuating pin 49 in the longitudinal direction thereof. A spring case 50 has a generally cylindrical shape, and is attached to the underneath of the movable clamp apparatus 43. The actuating pin 49 is movably accommodated within the spring case 50. A cover 51 is attached to the opening section of the spring case 50.

A first spring 51 is accommodated between the end wall of the spring case 50 and the enlarged portion 49a of the actuating pin 49, within the spring case 50. A second spring 53 is accommodated between the cover 51 and the enlarged portion 49a of the actuating pin 49, within the spring case 50. The movable clamp apparatus 43 is generally sustained at the neutral position on the actuating pin 49, via the spring case 50, under the urging force applied by the first and second springs 52 and 53.

As the sub-cylinder 48 is activated to protrude, and the piston rod 46a of the main cylinder 46 is activated to protrude, the movable clamp apparatus 43 is caused to shift toward the stationary clamp apparatus 41, by means of the actuating pin 49, the first and second springs 52 and 53, and the spring case 50. As a result, the workpiece W is positioned between the clamp apparatus 41 and the clamp apparatus 43, at predetermined drill positions. The movable support plate 27 is integrally shifted, via a connector 54, in relation to the shifting movement of the movable clamp apparatus 43, toward the stationary clamp apparatus 41.

A pressure sensor 55 is disposed at the inner wall situated at the inner most position of the spring case 50, facing the distal portion of the actuating pin 49. After the workpiece W is positioned in the desired position by the shift movement of the movable clamp apparatus 43, the actuating pin 49 is further shifted against the urging force of the first spring 52, when the movable clamp apparatus 43 is stopped. Consequently, as the pressure sensor 55 comes into contact with the distal portion of the actuating pin 49, a stop signal is generated and transmitted, in order to stop the movement of the main cylinder 46.

A sensor 56 is disposed at the end section of the main cylinder 46. The sensor 56 includes a roller 57 which rotates in accordance with the shift movement of the piston rod 46a, and a counter 58 for counting the revolutions of the roller 57. When the workpiece W is shifted by the main cylinder 46 and is clamped between the both clamp apparatus 41 and the clamp apparatus 43, the sensor 56 detects the shifting distance of the piston rod 46a. Then, the external width of the first flange Wb to the second flange Wb of the workpiece W is measured.

As illustrated in FIGS. 1 through 4, each pair of paired fasteners 59 is movably supported in the inner surfaces of the stationary clamp apparatus 41 and the fixed clamp apparatus 43, via a guide rod 60.

Each pair of cylinders 61 is disposed at the corresponding position with respect to the associate fastener 59, in the outer peripheral surfaces of the clamp apparatus 41 and the clamp apparatus 43. Each associate piston rod 61a is connected to the corresponding fastener 59. After the workpiece W is clamped between the clamp apparatus 41 and the clamp apparatus 43, and the width of the workpiece W is measured by the sensor 56, the movable clamp apparatus 43 is caused to return to the neutral position in the actuating pin 49, when the sub-cylinder 48 retracts. Therefore, each fastener 59 is shifted toward the clamp apparatus 41 and the clamp apparatus 43 by means of the cylinder 61. As a result, each lower distal edge of the first and second flanges Wb of the workpiece W is clamped by the corresponding fastener 59 and contacts 42 and 44 that are disposed on the clamp apparatus 41 and the clamp apparatus 44, respectively. The workpiece W is thus clamped in the desired drill position.

The support device which supports the web Wa of the workpiece W from the bottom side and a marking device during the drill operation will now be described. As illustrated in FIG. 5, a bracket 65 is movably supported on the base 2 by means of the rails 26. The bracket 65 is shifted by a cylinder (not shown) in the perpendicular direction to the shift direction of the workpiece W. A pair of cylinders 67 are disposed on the bracket 65 in the upright position. A lift 68 is securely spanned over the distal portions of the cylinders 67. A plurality of support pins 69, which are projecting upwardly, are equidistally disposed on the upper peripheral surface of the lift 68. As indicated by dotted line in FIG. 5, the cylinders 67 are activated so that the piston rods 67a are caused to protrude upwardly, to push the lift 68 in the upward direction. Therefore, each one of the support pins 69 comes into contact with the bottom surface of the web Wa of the workpiece W. The web Wa is securely supported by the plurality of supporting pins 69 without generating warp, during the drilling operation.

A support 70 is movably supported on the upper surface disposed at one side of the bracket 65, via a guide pipe 71 and a guide rod 72. The support 70 is shifted vertically by means of a cylinder 73. A contact pin 74, which is projecting in the upward direction, is disposed on the upper peripheral surface of the support 70. As indicated by a dotted line, the cylinder 73 is activated so that the cylinder rod 73a is caused to protrude upwardly, in order to push the support 70 in the upward direction. Therefore, the contact pin comes into contact with the bottom surface of the web Wa of the workpiece W.

A marking pin 75 is rotatably supported on the upper surface of the support 70. The marking pin 75 comes into contact with the bottom surface of the web Wa of the workpiece W, when the support 70 is lifted upwardly. A motor 76 is disposed underneath the support 70, via a fixture 77. The marking pin 75 is caused to rotate by means of the motor 76, when the marking pin 75 comes into contact with the web Wa. The marking is done on the bottom surface of the web Wa.

The operation of the clamp apparatus used in a hole machining device for drilling the structural beam, such as the H-beam, will now be described.

As illustrated in FIG. 1, when the workpiece W is clamped at a desirable position, by means of the clamp apparatuses described above, each fastener 59 is driven to retreat from the corresponding clamp apparatus 41 and clamp apparatus 43. Each flange Wb of the workpiece W is placed between a corresponding gap formed between the fastener 59 and the corresponding clamp apparatus 41 and clamp apparatus 43, when the workpiece W is moved to the drilling position. The movable clamp apparatus 43 is sustained at the neutral position on the actuating pin 49 by means of the first and second springs 52 and 53, as illustrated in FIG. 4.

Further, at that same time the sub-cylinder 48 is actuated to extend, the piston rod 46a of the main cylinder 46 is also actuated to extend. The movable clamp apparatus 43 is shifted toward the stationary clamp apparatus 41, via the actuating pin 49, the first and second springs 52 and 53, and the spring case 50. Therefore, the workpiece W is clamped between the clamp apparatuses 41 and 43 at the desirable drill position. The support plate 27 is integrally shifted, via the connector 54, in accordance with the shift movement of the movable clamp apparatus 43. The drills 36 are disposed close to the second flange Wb of the workpiece W positioned at the movable clamp apparatus side.

At the time when the movable clamp apparatus 43 comes in contact with the flange Wb of the workpiece W, the shifting operation for the clamp apparatus 43 is stopped. Furthermore, the piston rod 46a of the main cylinder 46 is actuated to extend.

As illustrated in FIG. 4, the actuating pin 49 is caused to shift against the urging force of the first spring 52. Thus, a space S is formed between the enlarged portion 49a of the pin 49 and the second spring 53. As the pressure sensor 55 engages the distal end of the pin 49, the sensor 55 transmits the stop signal in order to terminate the shift movement of the main cylinder 46.

The length measuring sensor 56 measures the shift in position of the piston rod 46a, when the main cylinder 46 is stopped, after the workpiece W has been clamped between the clamp apparatuses 41 and 43, with the movable clamp apparatus 43 being shifted by the main cylinder 46. The external width of the first flange to the second flange Wb of the workpiece W is determined, based on the measured shift in position.

In this embodiment, the sub-cylinder 48 is actuated to extend at that same time when the main cylinder 46 is actuated to extend. After the movable clamp apparatus 43 is halted, when the movable clamp apparatus 43 comes in contact with the flange Wb of the workpiece W, the piston rod 46a of the main cylinder 46 is further extended in order to form the space S, as illustrated in FIG. 4. The shifted in the position of the movable clamp apparatus 43 is determined by following manner; the extended length of the sub-cylinder 48 is added to the shifted length of the piston rod 46a measured by the sensor 56, then the length of the space S is subtracted from the sum previously calculated. The external width between both flanges Wb is determined by following manner: the shifted length of the movable clamp apparatus 43 is subtracted from the internal length between both clamp apparatuses 41 and 43.

The sub-cylinder 48 is caused to shorten, and the pin 49 is also retracted. Therefore, the pin 49 is further retracted beyond the neutral position of the first and second springs 52 and 53. The movable clamp apparatus 43 is retracted a little to retreat from the associate flange Wb of the workpiece W, via the second spring 53 and the spring case 50. Each fastener 59 is shifted toward the corresponding clamp apparatuses 41 and 43 by means of the cylinder 61. Each corresponding lower peripheral edge of the flanges Wb of the workpiece W is clamped between the corresponding fastener 59 and the corresponding contacts 42 and 44 of the clamp apparatuses 41 and 43, respectively.

When the clamping operation for the flanges Wb is completed, the movable clamp apparatus 43 is positioned, and is spaced apart from the outer peripheral surface of the flange Wb. As the fasteners 59 are shifted closer toward the inner peripheral surface of the flange Wb by means of the cylinder 61, the movable clamp apparatus 43 is shifted closer toward the outer peripheral surface of the flange Wb, against the urging force of the second spring 53, thus compressing the second spring 53. The flange Wb, which is positioned close to the stationary clamp apparatus 41, is clamped at a predetermined position along the edge of the stationary clamp apparatus 41. Therefore, the workpiece W is carried and disposed along the stationary clamp apparatus 41. The movable clamp 43 is shifted closer toward the stationary clamp apparatus 41 when the flange Wb, which faces the movable clamp apparatus 43, is clamped by the movable clamp apparatus 43 and the fasteners 59.

As the flanges Wb of the workpiece W are clamped by the clamp apparatuses 41 and 43, and the corresponding fasteners 59, the entire workpiece W is not affected by the clamp force of the clamp apparatuses 41 and 43. Therefore, even if warp and slight distortion is generated in the workpiece W, the workpiece W will be no longer bent, nor will the magnitude of its distortion increase. The corresponding bottom edges of the flanges Wb are securely clamped. As a result, the workpiece W is securely clamped at the predetermined drill position.

As the workpiece W is securely clamped, the drill 11, which is disposed above the web Wa is actuated and lowered, in order to drill a hole in the web Wa of the workpiece W clamped at the predetermined position, the drills 24 and 36 disposed at the associate side are actuated and shifted inward, in order to drill holes in both associate flanges Wb of the workpiece W at predetermined positions.

During the drilling operation, the workpiece W will not be off-set from the predetermined drilling position, because both flanges Wb are securely clamped, even if the driving force of the drills 24 and 36 is applied on the flanges Wb. After the completion of the first drilling operation, each fastener 59 is activated to retreat from the corresponding clamp apparatuses 41 and 43, by extending the cylinder 61. The workpiece W is freed from the clamping state. At that same time, the movable clamp apparatus 43 is shifted to retreat from the stationary clamp apparatus 41 by the urging force of the second spring 53. Therefore, the clearance is formed between the movable clamp apparatus 43 and the outer peripheral surface of the flange Wb of the workpiece W facing toward the movable clamp apparatus 43. The workpiece W is carried through the clearance.

Under this condition, the workpiece W is shifted by a predetermined magnitude in the longitudinal direction. After the shift movement of the workpiece W is completed, the corresponding distal edges of the flanges Wb are securely clamped by the fasteners 59 of the corresponding clamp apparatuses 41 and 43. The fasteners 59 move in the direction of the corresponding clamp apparatuses. Thus, the drilling operation of the web Wa and both flanges Wb is performed at the desirable positions. By repeating the foregoing steps, the drilling operation of the workpiece W will be completed.

According to the clamp apparatuses of the present embodiment, both bottom edges of the flanges Wb are clamped by means of the clamp apparatuses 41 and 43, and the corresponding fasteners 59. Thus, the workpiece W is securely clamped at the desirable drill position. Compared to a conventional clamp apparatus which clamps the entire length of the flanges Wb of the workpiece W from the outside, the clamp apparatus in the present invention permits the workpiece W, which may include warp or distortion to be securely clamped. Therefore, the present invention can prevent the workpiece W from bending, as well as drilling position from being offset from the predetermined position.

Although, only one embodiment of the present invention has been described herein, it should be apparent to those skilled in the art that the present invention may be embodied in many other specific forms without departing from the spirit or scope of the invention.

Particularly, it should be understood that the following mode is to be applied, such that the clamp apparatus is differently constructed in order to clamp a structural beam such as U-beam, which is placed at the clamp apparatus in the upsidedown position.

Therefore, the present examples and embodiments are to be considered as illustrative and not restrictive and the invention is not to be limited to the details giving herein.

What is claimed is:

1. A clamp apparatus utilizable for machining a workpiece, the clamp apparatus comprising:
   a stationary clamp means for clamping a first side of the workpiece, said stationary clamp means being secured on a base;
   a movable clamp means for clamping a second side of the workpiece, said movable clamp means being capable of moving in the direction of said stationary clamp means;
   a pair of guide rails disposed on said base in a direction that is generally perpendicular to the longitudinal direction of the workpiece for guiding said movable clamp means;
   fastening means, positionably secured to said stationary and said movable clamp means, for securely positioning the workpiece with respect to said stationary and moveable clamp means;
   a main cylinder secured on said movable clamp means for causing said movable clamp means to move, said main cylinder including a piston rod; and
   wherein the clamp apparatus further includes a power transmission mechanism disposed between said movable clamp means and said piston rod, a secondary cylinder that includes a movable plunger, an activating pin connected to said movable plunger, a case for movably accommodating said actuating pin, and a pair of springs disposed within said case to generally sustain said movable clamp means in a neutral position.

2. The clamp apparatus according to claim 1 further comprising pressure sensing means disposed within said case for sensing the pressure by contacting said actuating pin, wherein an electrical signal generated in said pressure sensing means controls the movement of said main cylinder.

3. The clamp apparatus according to claim 1, wherein said main cylinder includes sensing means for detecting the shift length of said piston rod, and for calculating the width of the workpiece based on the detected shift position of said piston rod.

* * * * *